United States Patent
Hüttl et al.

(10) Patent No.: US 12,525,865 B2
(45) Date of Patent: Jan. 13, 2026

(54) DYNAMIC SWITCHING TIME VARIATION IN PULSE INVERTERS

(71) Applicant: AUDI AG, Ingolstadt (DE)

(72) Inventors: Martin Hüttl, Abensberg (DE); Wolfgang Poisel, Tagmersheim (DE)

(73) Assignee: AUDI AG, Ingolstadt (DE)

( * ) Notice: Subject to any disclaimer, the term of this patent is extended or adjusted under 35 U.S.C. 154(b) by 296 days.

(21) Appl. No.: 18/184,537

(22) Filed: Mar. 15, 2023

(65) Prior Publication Data

US 2023/0378865 A1  Nov. 23, 2023

(30) Foreign Application Priority Data

May 17, 2022 (DE) .................. 102022112270.0

(51) Int. Cl.
  *H02M 1/00* (2007.01)
  *H02M 1/08* (2006.01)
  *H02M 7/537* (2006.01)

(52) U.S. Cl.
  CPC .......... *H02M 1/0054* (2021.05); *H02M 1/08* (2013.01); *H02M 7/537* (2013.01)

(58) Field of Classification Search
  CPC ....... H02M 1/0054; H02M 1/08; H02M 7/537
  See application file for complete search history.

(56) References Cited

U.S. PATENT DOCUMENTS

| | | |
|---|---|---|
| 2011/0007536 A1 | 1/2011 | Takamatsu et al. |
| 2013/0002173 A1 | 1/2013 | Baglino et al. |
| 2016/0099665 A1* | 4/2016 | Chen ............... H02M 7/53871 363/56.02 |
| 2017/0021733 A1 | 1/2017 | Kondou et al. |
| 2017/0222641 A1 | 8/2017 | Zou et al. |
| 2019/0326904 A1* | 10/2019 | Takakura ............ H02M 1/08 |

FOREIGN PATENT DOCUMENTS

| | | |
|---|---|---|
| CN | 106059552 A | 10/2016 |
| CN | 107741756 A | 2/2018 |
| DE | 102017101514 A1 | 8/2017 |
| DE | 102017201686 A1 | 8/2018 |
| WO | WO 2012069053 A2 | 5/2012 |

OTHER PUBLICATIONS

Office Action, dated Jan. 17, 2023, for German Patent Application No. 102022112270.0.(7 pages).

* cited by examiner

*Primary Examiner* — Jue Zhang
(74) *Attorney, Agent, or Firm* — Seed Intellectual Property Law Group LLP

(57) ABSTRACT

A device and a method are provided for dynamic switching time variation of power semiconductors in pulse inverters for a demand-oriented control of power loss.

10 Claims, 1 Drawing Sheet

DYNAMIC SWITCHING TIME VARIATION IN PULSE INVERTERS

BACKGROUND

Technical Field

The present disclosure relates to a device and a method for dynamic switching time variation of power semiconductors in pulse inverters for a demand-oriented control of the power loss.

Description of the Related Art

When power semiconductors (such as Insulated-Gate Bipolar Transistor (IGBT) or Metal-Oxide-Semiconductor Field-Effect Transistor (MOSFET)) are used in pulse inverters for the operation of traction motors in electric vehicles, the triggering of the corresponding components is organized such that a compromise is achieved between power loss-optimal implementation and low Electromagnetic Compatibility (EMC) interference potential.

The power loss of the power semiconductor is composed of on and off switching losses, as well as forward losses and reverse losses in the switched and opened power semiconductor. The triggering is chosen such that the on and off switching losses are minimized, which is achieved by appropriate driver circuits. The driver circuits are static, so that the resulting on and off switching times remain firmly defined (within tolerances of the components). Therefore, it is not possible to exert influence on the switching losses during operation.

In certain driving situations, it may make sense to not operate the pulse inverter with optimal efficiency. For example, a so-called "poor efficiency operation" can be used to generate more heat for heating the vehicle interior or for conditioning a High Voltage (HV) battery when the battery is cold by increased power loss surrendered to the cooling water.

CN 106 059 552 A discloses a driver circuit based on a dynamic characteristic switching a MOSFET. The driver circuit comprises a control unit, an insulating unit, and a MOSFET driver unit. The control unit is used to sample a gate voltage during a switching process of a MOSFET and to generate logic signals which are required to trigger a resistor switch of each stage of the switching process of the MOSFET. The insulating unit is used to realize an electrical insulation between the control unit and the MOSFET driver unit in order to improve the noise immunity of the circuit. The MOSFET driver unit is used to receive the logic signals of the electrically insulated control unit in order to complete the switching of the driver resistor in each stage of the switching of the MOSFET. Based on the dynamic switching properties of the MOSFET, the driver circuit can improve the stability and safety of the MOSFET device at the cost of a low switching speed and simplicity.

From DE 10 2017 101 514 A1 there is known an inverter comprising an n-channel IGBT with a freewheeling diode, which is coupled to one phase of an electric machine, and a MOSFET, which couples a local potential to a gate of the IGBT and is designed to transition from saturation to linear operation when the direction of current flow through the diode switches from positive to negative while the IGBT is initiating a current through the electric machine.

CN 107 741 756 A relates to a driver circuit for dynamically variable IGBT switching characteristics and a protection method for this. The driver circuit for dynamic variable IGBT switching characteristics comprises a pulse distribution and digital control chip, switching arrays and gate driver resistor arrays. The pulse distribution and digital control chip is connected to the input end of an upper bridge branch of the IGBT across a portion of the switching arrays and a portion of the gate driver resistor arrays and to the input end of a lower bridge branch of the IGBT by the rest of the switching arrays and the rest of the gate driver resistor arrays. The pulse distribution and digital control chip receives the control pulse signals of a controller, receives status information which is relayed back to the upper bridge branch of the IGBT and the lower bridge branch of the IGBT, puts out control pulses to trigger the upper bridge branch of the IGBT and the lower bridge branch of the IGBT after completion of pulse distribution, pulse self-locking, pulse locking, and other procedures according to the control pulse signals and the status information, and in the meantime controls the switch arrays to dynamically change the gate driver resistors.

BRIEF SUMMARY

Embodiments of the invention provide a method and a device with which switching losses of a power semiconductor can be adapted to a currently required operating mode of a pulse inverter during the operation of the pulse inverter.

The subject matter of the disclosure is a device for control of at least one power semiconductor of a pulse inverter (PWR), comprising a microcontroller, a gate driver circuit, and a selection circuit for a gate series resistor, the output of which is connected to a gate of the at least one power semiconductor, wherein the microcontroller is adapted to relay a first triggering signal to the gate driver circuit in order to switch it on or off, and to relay a second triggering signal to the selection circuit in order to select a gate series resistor.

In one embodiment, the at least one power semiconductor is an IGBT. In another embodiment, the at least one power semiconductor is a MOSFET. In another embodiment, the at least one power semiconductor is a MOSFET based on silicon carbide (SiC-MOSFET).

In one embodiment, the selection circuit for a gate series resistor comprises at least two different series resistors. In another embodiment, the selection circuit for a gate series resistor comprises more than two different series resistors, such as three or four different series resistors. In theory, as many series resistors as desired can be implemented, although there are limits here dictated by the space requirement. In the most simple embodiment, the selection circuit comprises two different series resistors. In one embodiment, the resistance value of the series resistors is from 1 to 10 Ohm, for example 1 to 5 Ohm.

In a control device according to an embodiment of the disclosure, a normally customary gate driver circuit is expanded with a gate series resistor selector, a gate series resistor R1 or R2 of which can be selected by a triggering signal of the microcontroller. By changing this resistor, the switching time of a power semiconductor and thus power loss that occurs can be varied. In one embodiment, the power loss can be increased by up to 30%. In one embodiment, a maximum occurring power loss is 4 to 6 kW per pulse inverter, for example 5 to 6 kW.

According to an embodiment of the invention, a method for control of a pulse inverter in an electric vehicle is provided, in which an efficiency of at least one power semiconductor of the pulse inverter is altered by dynamic variation of switching times of the at least one power semiconductor in order to adapt a power loss occurring in the pulse inverter to a currently required operating mode of the electric vehicle.

According to an embodiment of the invention, switching losses of a power semiconductor are adapted to a currently required operating mode of an electric vehicle, wherein a gradual switching between increased or reduced power loss is possible. In one embodiment of the method, switching times of the at least one power semiconductor are lengthened when an increased power loss is required for heating a coolant in a heating circuit of the electric vehicle, for example for heating of an interior of the vehicle or for conditioning of a HV battery of the electric vehicle during cold weather.

Among the benefits of the solution according to embodiments of the invention are greater comfort for vehicle passengers thanks to faster heating of the cooling system during cold outside conditions, longer service life of the HV battery, and better utilization of a battery capacity, as well as cost savings through elimination of additionally required heating appliances, such as a supplemental external heater in the overall vehicle. Further benefits and embodiments of the invention will emerge from the specification and the accompanying drawings.

Of course, the features mentioned above and those yet to be explained below can be used not only in the particular indicated combination, but also in other combinations or standing alone.

DETAILED DESCRIPTION

Figure 1:
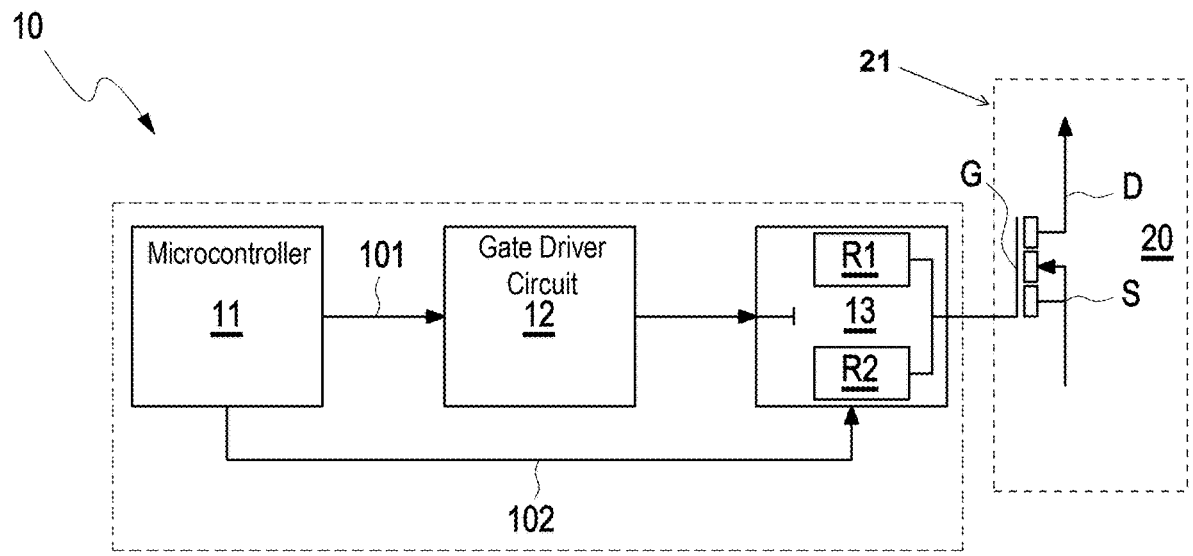
FIG. 1 shows a schematic representation of one embodiment of a control device.

FIG. 1 shows schematically one embodiment of a control device 10 and a power semiconductor 20 connected to it. In the embodiment shown, the power semiconductor 20 is a MOSFET based on a silicon carbide (SiC-MOSFET) in a pulse inverter (PWR) of an electric vehicle.

The control circuit 10 triggers a gate G of the power semiconductor 20 and comprises a microcontroller 11, which controls a gate driver circuit 12 and a gate series resistor selection circuit 13. The microcontroller 11 is designed to switch the gate driver circuit 12 on or off by a first triggering signal 101 and to select a gate series resistor R1 or R2 of the gate series resistor selection unit 13 by a second triggering signal 102.

If the microcontroller 11 switches on the gate driver circuit 12, this triggers the gate G of the power semiconductor 20 through the selected series resistor R1 or R2 of the selection circuit 13. The series resistor R1 or R2 influences a switching time of the power semiconductor 20 and thus power loss that occurs.

Figure 2:
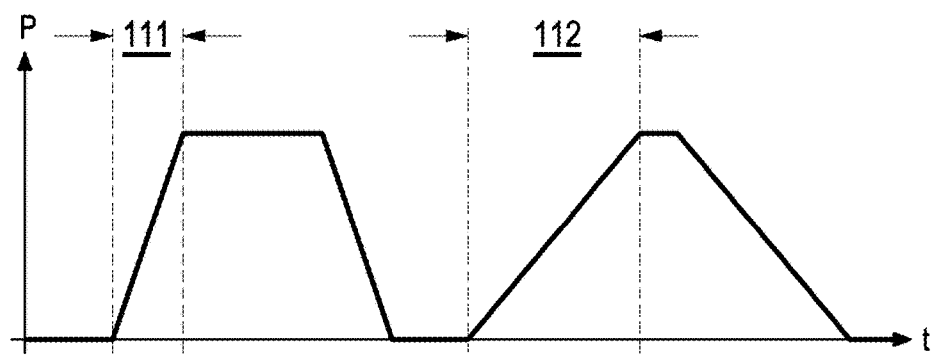
FIG. 2 shows a representation of switched power and power loss over time.
Figure 2:
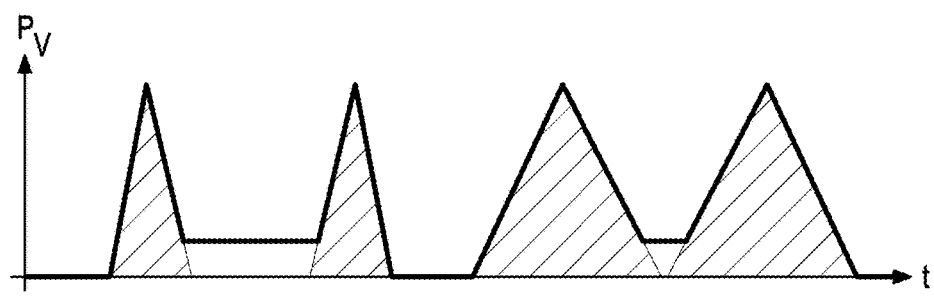

FIG. 2 shows diagrams of a power P switched through the power semiconductor 20 of the control circuit 10 of FIG. 1 (upper diagram) and a resulting power loss Pv (lower diagram) over time t for different series resistors R1 and R2. A qualitatively switched power through the power semiconductor 20 is shown, once with a short switching time 111 when using the series resistor R1 and once with qualitatively switched longer switching time 112 when using the series resistor R2. The hatched regions in the lower diagram correspond to the power loss occurring during the switching processes. As can be seen from the diagram, a distinctly larger power loss Pv occurs with the longer switching time 112 than with the shorter switching time 111.

The on and off switching times of the power semiconductor 20 each lie in a nanosecond range. The switching between the series resistors R1 and R2 is performed dynamically during the operation and likewise takes only a few nanoseconds.

In one exemplary embodiment, the shorter switching time 111 amounts to 10 ns and the longer switching time 112 amounts to 200 ns. With a switched power P (per power semiconductor 20) of 1 kW, there occurs a power loss Pv (per power semiconductor 20) of 30 W during fast switching (switching time 111) or 300 W during slow switching (switching time 112).

German patent application no. 102022112270.0, filed May 17, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for control of at least one power semiconductor of a pulse inverter, the device comprising:
    a microcontroller;
    a gate driver circuit; and
    a selection circuit including a plurality of gate series resistors,
    wherein an output of the selection circuit is connected to a gate of the at least one power semiconductor of the pulse inverter,
    wherein the microcontroller, in operation, provides to the gate driver circuit a first triggering signal that switches the gate driver circuit on or off, and provides to the selection circuit a second triggering signal that selects one of the gate series resistors of the selection circuit,
    wherein the selection circuit, in operation, triggers the gate of the at least one power semiconductor of the pulse inverter to increase power through the at least one power semiconductor of the pulse inverter using only a first one of the gate series resistors during a first period of time, and
    wherein the selection circuit, in operation, triggers the gate of the at least one power semiconductor of the pulse inverter to increase power through the at least one power semiconductor of the pulse inverter using only a second one of the gate series resistors that is different from the first one of the gates series resistors during a second period of time that is different from the first period of time.

2. The device according to claim 1, wherein the at least one power semiconductor includes an Insulated-Gate Bipolar Transistor (IGBT).

3. The device according to claim 1, wherein the at least one power semiconductor includes a Metal-Oxide-Semiconductor Field-Effect Transistor (MOSFET).

4. The device according to claim 3, wherein the MOSFET is a silicon carbide MOSFET (SiC-MOSFET).

5. The device according to claim 1, wherein the plurality of gate series resistors includes at least two different gate series resistors respectively having two different resistance values.

6. A method for control of a pulse inverter in an electric vehicle, the method comprising:
operating at least one power semiconductor of the pulse inverter according to a first switching time;
operating the at least one power semiconductor of the pulse inverter according to a second switching time that is different from the first switching time; and
controlling the at least one power semiconductor of the pulse inverter to dynamically change between operating according to the first switching time and operating according to the second switching time,
wherein the controlling the at least one power semiconductor of the pulse inverter alters an efficiency of the at least one power semiconductor of the pulse inverter and adapts a power loss occurring in the pulse inverter to a currently required operating mode of the electric vehicle,
wherein a gate of the at least one power semiconductor of the pulse inverter is triggered to increase power through the at least one power semiconductor of the pulse inverter using only a first one of a plurality of gate series resistors during a first period of time, and
wherein the gate of the at least one power semiconductor of the pulse inverter to increase power through the at least one power semiconductor of the pulse inverter using only a second one of the plurality of gate series resistors that is different from the first one of the plurality of gates series resistors during a second period of time that is different from the first period of time.

7. The method according to claim 6, wherein the controlling the at least one power semiconductor of the pulse inverter increases or reduces a power loss of the at least one power semiconductor of the pulse inverter.

8. The method according to claim 6, wherein:
the second switching time is greater than the first switching time, and
the controlling the at least one power semiconductor of the pulse inverter includes controlling the at least one power semiconductor of the pulse inverter to change from operating according to the first switching time to operating according to the second switching time when an increased power loss is required for heating a coolant in a heating circuit of the electric vehicle.

9. The method according to claim 8, further comprising:
heating an interior of the electric vehicle using the heating circuit.

10. The method according to claim 8, further comprising:
heating a battery of the electric vehicle using the heating circuit.

* * * * *